United States Patent
Hatta et al.

(10) Patent No.: US 12,319,362 B2
(45) Date of Patent: Jun. 3, 2025

(54) HOUSING BODY AND WORKING MACHINE

(71) Applicant: KUBOTA CORPORATION, Osaka (JP)

(72) Inventors: Kazuyuki Hatta, Sakai (JP); Hiroyuki Ueda, Sakai (JP); Tadayoshi Umemoto, Sakai (JP); Yoshiyuki Enomoto, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 923 days.

(21) Appl. No.: 17/484,433

(22) Filed: Sep. 24, 2021

(65) Prior Publication Data

US 2022/0009564 A1 Jan. 13, 2022

Related U.S. Application Data

(63) Continuation of application No. PCT/JP2020/010242, filed on Mar. 10, 2020.

(30) Foreign Application Priority Data

Mar. 25, 2019 (JP) .................................. 2019-056976

(51) Int. Cl.
*B62D 33/06* (2006.01)
*B60N 3/10* (2006.01)
(Continued)

(52) U.S. Cl.
CPC ........... *B62D 33/0617* (2013.01); *B60N 3/10* (2013.01); *B60R 7/04* (2013.01); *B62D 1/12* (2013.01);
(Continued)

(58) Field of Classification Search
CPC ...... B62D 33/0617; B62D 1/12; B62D 49/00; B60N 3/10; B60N 2/24; B60N 2/79;
(Continued)

(56) References Cited

U.S. PATENT DOCUMENTS 5,387,010 A * 2/1995 Mohr ..................... B42D 17/00
D34/27
11,053,661 B2 * 7/2021 Kikuchi ................ E02F 9/2221
(Continued)

FOREIGN PATENT DOCUMENTS

DE 198 05 998 C1 4/1997
DE 10 2010 026 383 A1 1/2012
(Continued)

OTHER PUBLICATIONS

Extended European Search Report for European Application No. 20776623.9, dated Nov. 28, 2022.

*Primary Examiner* — Pinel E Romain
(74) *Attorney, Agent, or Firm* — Birch, Stewart, Kolasch & Birch, LLP

(57) ABSTRACT

The disclosed art includes: a machine body; an operator's seat mounted on the machine body and including a seat part and a backrest part; a manipulator base disposed on a lateral side of the operator's seat; and a housing body for housing a printed material therein, and the housing body is disposed forward of the backrest part and on the opposite side of the manipulator base from the operator's seat.

11 Claims, 15 Drawing Sheets

(51) Int. Cl.
- *B60R 7/04* (2006.01)
- *B62D 1/12* (2006.01)
- *B62D 49/00* (2006.01)
- *E02F 3/32* (2006.01)
- *E02F 3/76* (2006.01)
- *E02F 3/96* (2006.01)
- *E02F 9/20* (2006.01)

(52) U.S. Cl.
CPC ............... *B62D 49/00* (2013.01); *E02F 3/32* (2013.01); *E02F 3/7618* (2013.01); *E02F 3/963* (2013.01); *E02F 9/2004* (2013.01)

(58) Field of Classification Search
CPC ........ B60N 2/797; B60N 3/101; B60R 7/043; E02F 3/32; E02F 3/7618; E02F 3/963; E02F 9/2004; E02F 3/844; E02F 9/16
USPC ..................... 296/24, 37.8, 63, 64, 37.16
See application file for complete search history.

(56) References Cited

U.S. PATENT DOCUMENTS

| | | | |
|---|---|---|---|
| 2008/0143161 A1 | 6/2008 | Ayabe | |
| 2009/0008189 A1 | 1/2009 | Kim | |
| 2012/0298678 A1 * | 11/2012 | Hanson | B60R 7/043 |
| | | | 220/694 |
| 2016/0305092 A1 | 10/2016 | Yukawa | |

FOREIGN PATENT DOCUMENTS

| | | | | |
|---|---|---|---|---|
| EP | 0 841 211 A2 | | 5/1998 | |
| JP | 6-44627 U | | 6/1994 | |
| JP | 2001020322 A | * | 1/2001 | |
| JP | 2001-122043 A | | 5/2001 | |
| JP | 2005-213816 A | | 8/2005 | |
| JP | 2006-62424 A | | 3/2006 | |
| JP | 2007-1421 A | | 1/2007 | |
| JP | 2008063812 A | * | 3/2008 | |
| JP | 201246887 | * | 3/2012 | |
| JP | 2012-153178 A | | 8/2012 | |
| JP | 5992727 B2 | | 9/2016 | |
| JP | 2016-204890 A | | 12/2016 | |
| JP | 2021102840 A | * | 7/2021 | ............... B60R 7/08 |
| WO | WO-0063501 A1 | * | 10/2000 | ............... E02F 9/16 |

* cited by examiner

HOUSING BODY AND WORKING MACHINE

CROSS REFERENCE TO RELATED APPLICATIONS

This application is a continuation application of international application No. PCT/JP2020/010242, filed on Mar. 10, 2020, which claims the benefit of priority to Japanese Patent Application No. 2019-056976, filed on Mar. 25, 2019. The entire contents of each of these applications are hereby incorporated herein by reference.

BACKGROUND OF THE INVENTION

Field of the Invention

The present invention relates to a housing body provided in a working machine such as a backhoe, and relates to a working machine.

Description of the Related Art

A working machine disclosed in Japanese Unexamined Patent Application Publication No. 2006-62424 is known. The working machine disclosed in Japanese Unexamined Patent Application Publication No. 2006-62424 includes a storage portion that stores an operation manual or the like and that is located below the front portion of the operator's seat. An operator can take the operation manual or the like out of the storage portion while seated on the operator's seat.

SUMMARY OF THE INVENTION

However, in the working machine disclosed in Japanese Unexamined Patent Application Publication No. 2006-62424, the operation manual is stored in the storage portion provided below the operator's seat; therefore, the operation manual is hidden from the view of the operator seated on the operator's seat, and it is not easy for the operator to know where the operation manual is. On the contrary, if the storage portion for the operation manual is disposed in front of the operator's seat, the storage portion may interfere with the manipulation of a manipulator lever or the like.

In view of the above issue, an object of the present invention is to locate a printed material such as an operation manual such that the operator can easily know where the printed material is and that the printed material does not interfere with manipulation.

A working machine according to an aspect of the present invention includes: a machine body; an operator's seat mounted on the machine body and including a seat part and a backrest part; a manipulator base disposed on a lateral side of the operator's seat; and a housing body for housing a printed material therein, and the housing body is disposed forward of the backrest part and on an opposite side of the manipulator base from the operator's seat.

The manipulator base includes a drink holder for holding a beverage container, and the housing body is engaged to the drink holder.

The housing body includes: a housing portion configured to house a printed material therein and having an insertion opening at an upper portion thereof; and a stopper protrusion provided above the insertion opening to prevent the printed material from escaping from the housing portion.

The working machine further includes: a front working device including a boom and a working tool, a manipulator lever for operating the front working device is provided on the manipulator base, and the housing body is disposed forward of the manipulator lever.

The working machine includes a dozer, and a dozer lever for operating the dozer is provided on the manipulator base, the dozer lever is disposed on an opposite side of the manipulator lever from the operator's seat and rearward of the manipulator lever, and the housing body is disposed on an opposite side of the manipulator lever from the operator's seat and forward of the dozer lever.

The working machine further includes: a traveling device; and a traveling lever for operating the traveling device, the traveling lever being disposed forward of the operator's seat, and the housing body is disposed rearward of the traveling lever.

Furthermore, an upper portion of the housing body protrudes upward from an upper surface of the manipulator base.

Furthermore, an upper end of the housing body is disposed lower than an upper end of the manipulator lever.

The housing body includes: an engagement portion to be engaged to an upper portion of the drink holder; and an attachment part to be attached to the manipulator base, the attachment part being disposed below the engagement portion.

A housing body according to an aspect of the present invention is a housing body for housing a printed material therein, the housing body being attached to a working machine, the working machine including a machine body, an operator's seat, a manipulator base disposed on a lateral side of the operator's seat, and a drink holder provided on the manipulator base, and the housing body includes: an engagement portion to be engaged to an upper portion of the drink holder; and an attachment part to be attached to the manipulator base, the attachment part being disposed below the engagement portion.

The housing body further includes: a housing portion configured to house a printed material therein and having an insertion opening at an upper portion thereof; and a stopper protrusion provided above the insertion opening to prevent the printed material from escaping from the housing portion.

The above configuration makes it possible to locate a printed material such as an operation manual such that the operator can easily know where the printed material is and that the printed material does not interfere with manipulation.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
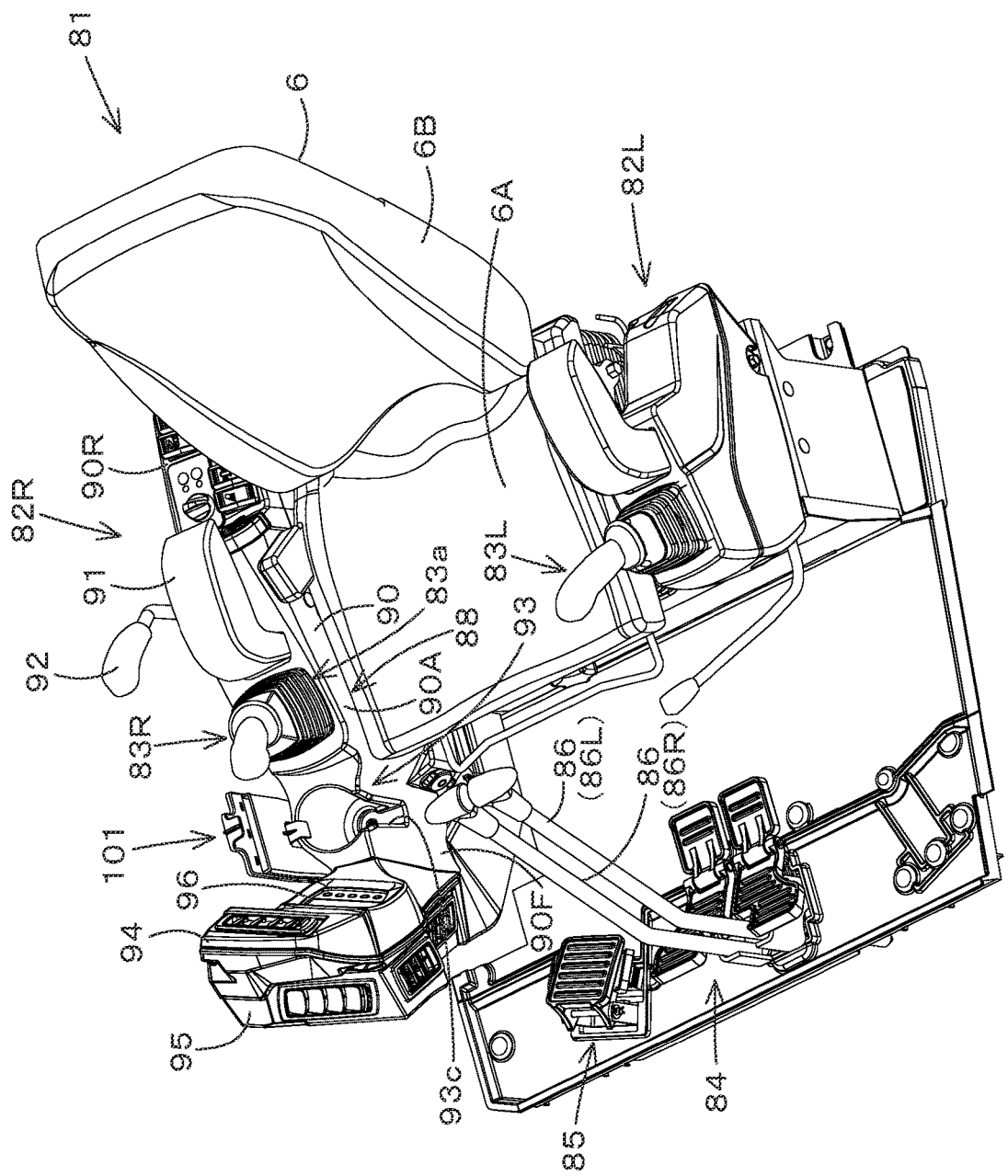
FIG. 1 is a perspective view of an operator section.

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description will discuss an embodiment of the present invention with reference to drawings as appropriate.

Figure 14:
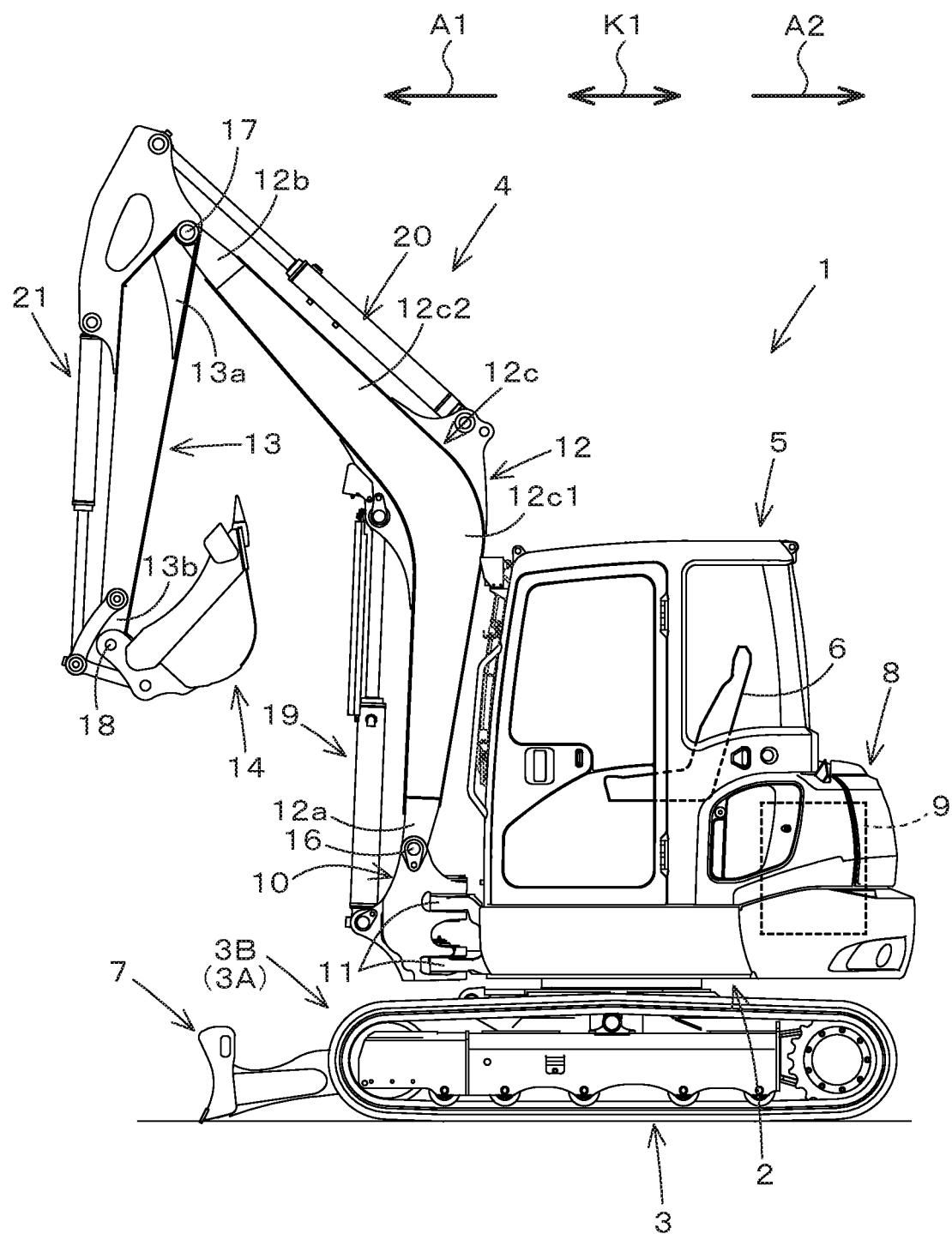
FIG. 14 is a side view of a working machine.
Figure 15:
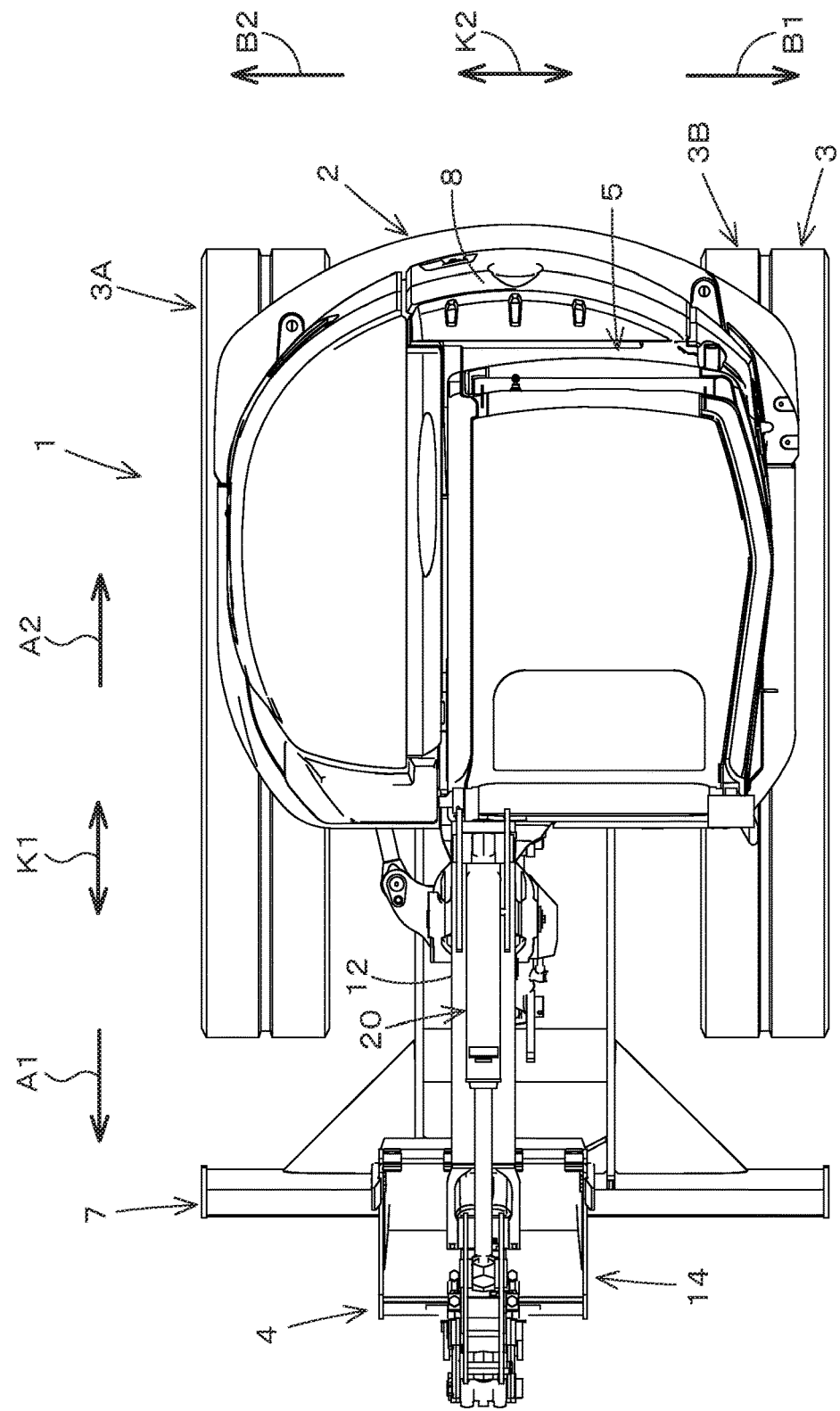
FIG. 15 is a plan view of the working machine.

FIG. 14 is a side view schematically illustrating an overall configuration of a working machine 1 according to the present embodiment. FIG. 15 is a plan view schematically illustrating the working machine 1. In the present embodiment, a backhoe, which is a revolving working machine, is illustrated as an example of the working machine 1.

As illustrated in FIGS. 14 and 15, the working machine 1 includes a machine body (revolving frame) 2, a traveling device 3, and a front working device 4. The machine body 2 has a cabin 5 mounted thereon. The cabin 5 includes, in the room thereof, an operator's seat 6 on which an operator (driver) is to be seated.

In the present embodiment, the following description is based on the assumption that the front end of the working machine 1 as viewed from the operator seated on the operator's seat 6 (indicated by arrow A1 in FIGS. 14 and 15) is "front" or forward", that the rear end as viewed from the operator (indicated by arrow A2 in FIGS. 14 and 15) is "rear" or "rearward", that the left side as viewed from the operator (near side of FIG. 14, indicated by arrow B1 in FIG. 15) is "left" or "leftward" (or machine body's left), and that the right side as viewed from the operator (far side of FIG. 14, indicated by arrow B2 in FIG. 15) is "right" or "rightward" (or machine body's right). The following description is also based on the assumption that, as illustrated in FIG. 15, a horizontal direction orthogonal to a front-rear direction K1 is "machine body width direction" (width direction of machine body) K2.

The following description is based on the assumption that a rightward direction or leftward direction from the widthwise center of the machine body 2 is "outward direction along the machine body width direction", and that the opposite direction to the outward direction along the machine body width direction is "inward direction along the machine body width direction".

As illustrated in FIGS. 14 and 15, the traveling device 3 is a crawler-type traveling device that includes: a first crawler travel unit 3A provided on one of the opposite sides of the machine body 2 in the machine body width direction K2 (on the right side of the machine body 2); and a second crawler travel unit 3B provided on the other of the opposite sides of the machine body 2 in the machine body width direction K2 (on the left side of the machine body 2). The traveling device 3 supports the machine body 2 such that the machine body 2 can travel. The machine body 2 is supported on the traveling device 3 such that the machine body 2 can revolve on a vertical axis (axis extending along the top-bottom direction). A dozer 7 is attached to a front portion of the traveling device 3.

As illustrated in FIG. 15, the cabin 5 is mounted at a position offset from the widthwise center of the machine body 2 in the machine body width direction K2 toward the other of the opposite sides of the machine body 2 in the machine body width direction K2. The machine body 2 has, on a rear portion thereof, a prime mover 9 and a hood 8 that covers the prime mover 9.

As illustrated in FIGS. 14 and 15, the front working device 4 is disposed forward of the cabin 5. Specifically, as illustrated in FIG. 15, the front working device 4 is disposed at a position offset from the widthwise center of the cabin 5 in the machine body width direction K2 toward one of the opposite sides of the cabin 5 in the machine body width direction K2.

As illustrated in FIG. 14, the front working device 4 is supported by a swing bracket 10, and the swing bracket 10 is supported by a support bracket 11. The support bracket 11 is fixed to the machine body 2 and protrudes forward from the machine body 2. The swing bracket 10 is supported by the support bracket 11 such that the swing bracket 10 is pivotable about the vertical axis.

As illustrated in FIG. 14, the front working device 4 includes a boom 12, an arm 13, and a working tool (bucket) 14. The boom 12 has a proximal portion 12*a* supported via a boom shaft 16 on an upper portion of the swing bracket 10 such that the proximal portion 12*a* is pivotable about a lateral horizontal axis (axis extending along the lateral horizontal direction). This allows the boom 12 to swing upward and downward. That is, the front working device 4 is capable of swinging upward and downward.

The arm 13 has a proximal portion 13*a* pivotably supported on a distal portion 12*b* of the boom 12 via an arm shaft 17 that has an axis parallel to the boom shaft 16. This allows the arm 13 to swing in a crowd direction toward the boom 12 and in a dump direction away from the boom 12. The working tool 14 is pivotably supported on a distal portion 13*b* of the arm 13 via a working tool shaft 18 that has an axis parallel to the arm shaft 17. This allows the working tool 14 to swing in a crowd direction toward the arm 13 and in a dump direction away from the arm 13.

The front working device 4 includes a boom cylinder 19 that drives the boom 12, an arm cylinder 20 that drives the arm 13, and a working tool cylinder 21 that drives the working tool 14. The boom cylinder 19, the arm cylinder 20, and the working tool cylinder 21 are each composed of a hydraulic cylinder.

The direction of the axis of the boom shaft 16 coincides with the machine body width direction K2 when the front working device 4 is directed in front of the machine body. The boom 12 includes an intermediate portion 12*c* that lies between the proximal portion 12*a* and the distal portion 12*b* and that is bent at an intermediate portion (substantially middle) of the length of the boom 12. The intermediate portion 12*c* includes a first section 12*c*1 on the proximal portion 12*a* side and a second section 12*c*2 on the distal portion 12*b* side. When the front working device 4 (boom 12) is in a fully raised position as illustrated in FIG. 14, the first section 12*c*1 extends along the top-bottom direction, and the second section 12*c*2 extends in an inclined direction that is inclined forward with increasing distance from the upper end of the first section 12*c*1 upward. Furthermore, when the front working device 4 is in the fully raised position, the first section 12*c*1 is opposed from a portion (right portion) of the cabin 5 and is in proximity to the front of that portion of the cabin 5.

The working machine 1 includes an operator section 81 as illustrated in FIG. 1. The operator section 81 is disposed in the room of the cabin 5. The operator section 81 includes an operator's seat 6. The operator's seat 6 is mounted on the machine body 2.

As illustrated in FIG. 1, the operator's seat 6 includes a seat part 6A and a backrest part 6B. The seat part 6A is a part on which an operator is to be seated (on which the operator's bottom and thighs are to be placed). The backrest part 6B is a part on which the back of the operator seated is to rest, and is disposed at the rear of the seat part 6A so as to extend upward.

As illustrated in FIG. 1, the operator section 81 includes: a right manipulator unit (referred to as "first manipulator unit") 82R disposed on one side (right side) of the operator's seat 6; and a left manipulator unit (referred to as "second manipulator unit") 82L disposed on the other side (left side) of the operator's seat 6. The first manipulator unit 82R includes a manipulator lever (referred to as "first manipulator lever") 83R, and the second manipulator unit 82L includes a manipulator lever (referred to as "second manipulator lever") 83L. The manipulator levers 83R and 83L are members manipulated to operate the front working device 4 and the like. Specifically, the first manipulator lever 83R is, for example, a member to operate a boom control valve that controls the boom cylinder 19 and an arm control valve that controls the arm cylinder 20. The second manipulator lever 83L is, for example, a member to operate a working tool control valve that controls the working tool cylinder 21 and a revolution control valve that controls a revolving motor to cause the machine body 2 to revolve.

The operator section 81 includes at least one travel operation member 84 and an operation pedal 85, which are disposed forward of the operator's seat 6. The at least one travel operation member 84 includes: traveling levers 86 (a first traveling lever 86R and a second traveling lever 86L) that operate the traveling device 3; and traveling pedals 87 (a first traveling pedal 87R and a second traveling pedal 87L). The first traveling lever 86R and the first traveling pedal 87R are members to operate the first crawler travel unit 3A. The second traveling lever 86L and the second traveling pedal 87L are members to operate the second crawler travel unit 3B. The operation pedal 85 is, for example, a member to operate the swing bracket 10 to swing.

As illustrated in FIGS. 1 to 4, the first manipulator unit 82R includes a manipulator base 88 provided with the first manipulator lever 83R. The manipulator base 88 includes: a support bracket 89 attached to the machine body 2 via an attachment member; and a console box 90 attached to the support bracket 89. The console box 90 is disposed on a lateral side of the operator's seat 6.

Figure 2:
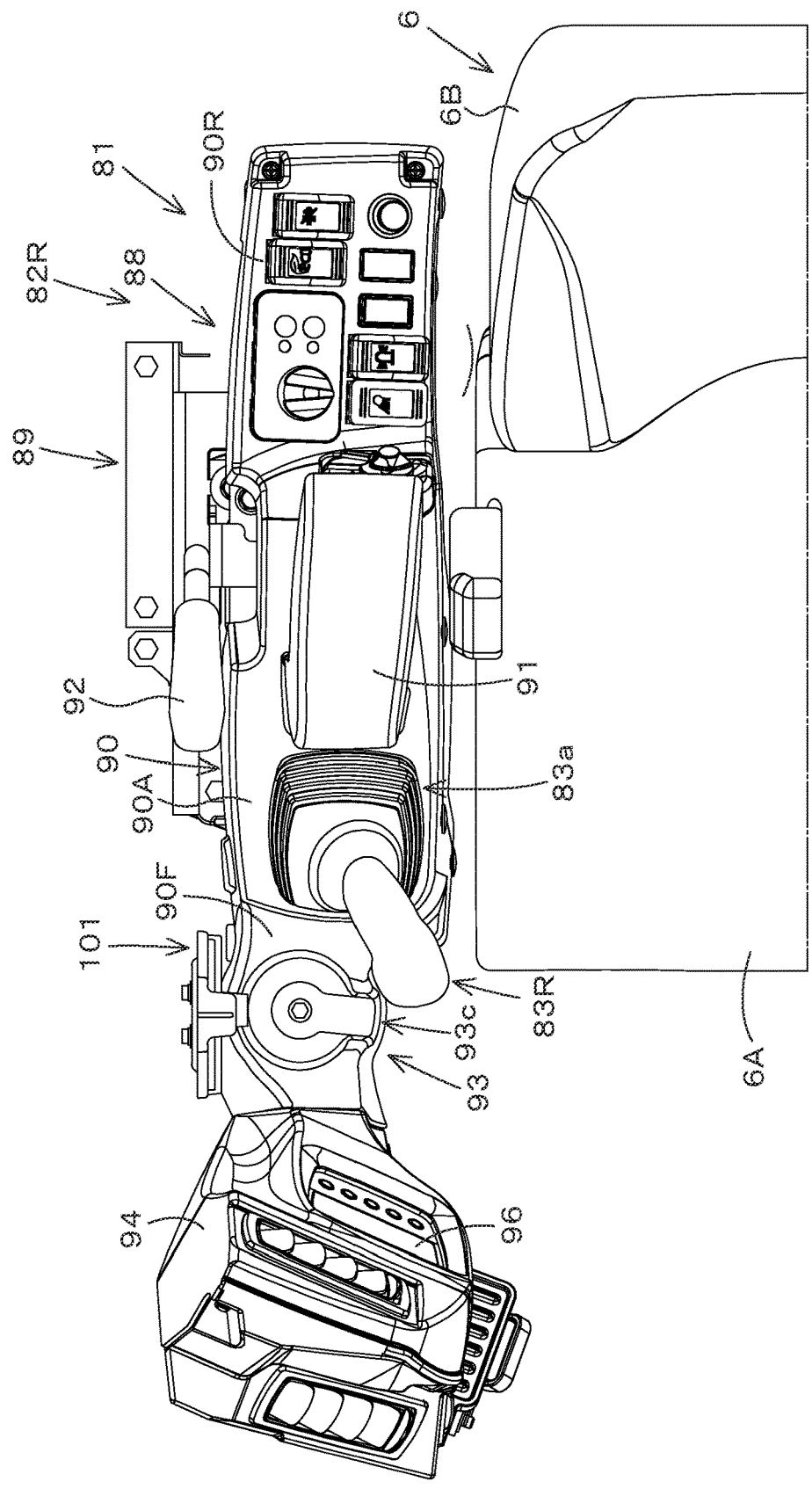
FIG. 2 is a plan view of a right portion of the operator section.

As illustrated in FIG. 2, the console box 90 includes: an intermediate section 90A lying in the middle of the console box 90 in the front-rear direction; a front section 90F that protrudes forward from the intermediate section 90A; and a rear section 90R that protrudes rearward from the intermediate section 90A. The intermediate section 90A is disposed on a lateral side of the seat part 6A. The front section 90F has a rear-end portion located on a lateral side of a front-end portion of the seat part 6A, and has an intermediate portion and a front portion protruding forward relative to the seat part 6A. The rear section 90R has a front portion located on a lateral side of a rear portion of the seat part 6A, and has a rear portion protruding rearward relative to the seat part 6A.

As illustrated in FIGS. 1 to 4, the first manipulator lever 83R is disposed in a front portion of the intermediate section 90A of the console box 90 and is disposed on the lateral side of the front portion of the seat part 6A. The intermediate section 90A is provided with an armrest 91 for placement of the operator's elbow or forearm. The armrest 91 is disposed rearward of the first manipulator lever 83R. The armrest 91 is disposed on the lateral side of the operator's seat 6. Specifically, the armrest 91 is disposed on the lateral side of the rear portion of the seat part 6A. A dozer lever (operation lever) 92 to operate the dozer 7 is disposed on the opposite side of the armrest 91 from the operator's seat 6. The dozer lever 92 is disposed on the opposite side of the console box 90 (intermediate section 90A) from the operator's seat 6, is supported by the support bracket 89 such that the dozer lever 92 is swingable back and forth, and is, when in a neutral position, disposed rearward of the first manipulator lever 83R.

The front section 90F (console box 90) includes a drink holder 93 for holding a beverage container. The rear section 90R is provided with various switches. The front section 90F has a panel cover 94 connected thereto. The panel cover 94 has a display panel 96 disposed on the rear side thereof. The panel cover 94 has a duct cover 95 connected to the front side thereof. The duct cover 95 is a member to cause a flow of conditioned air, and extends from a lower side portion of the operator's seat 6 forward beyond the panel cover 94. An upper front portion of the duct cover 95, together with the panel cover 94, forms a flow path of the conditioned air.

Figure 3:
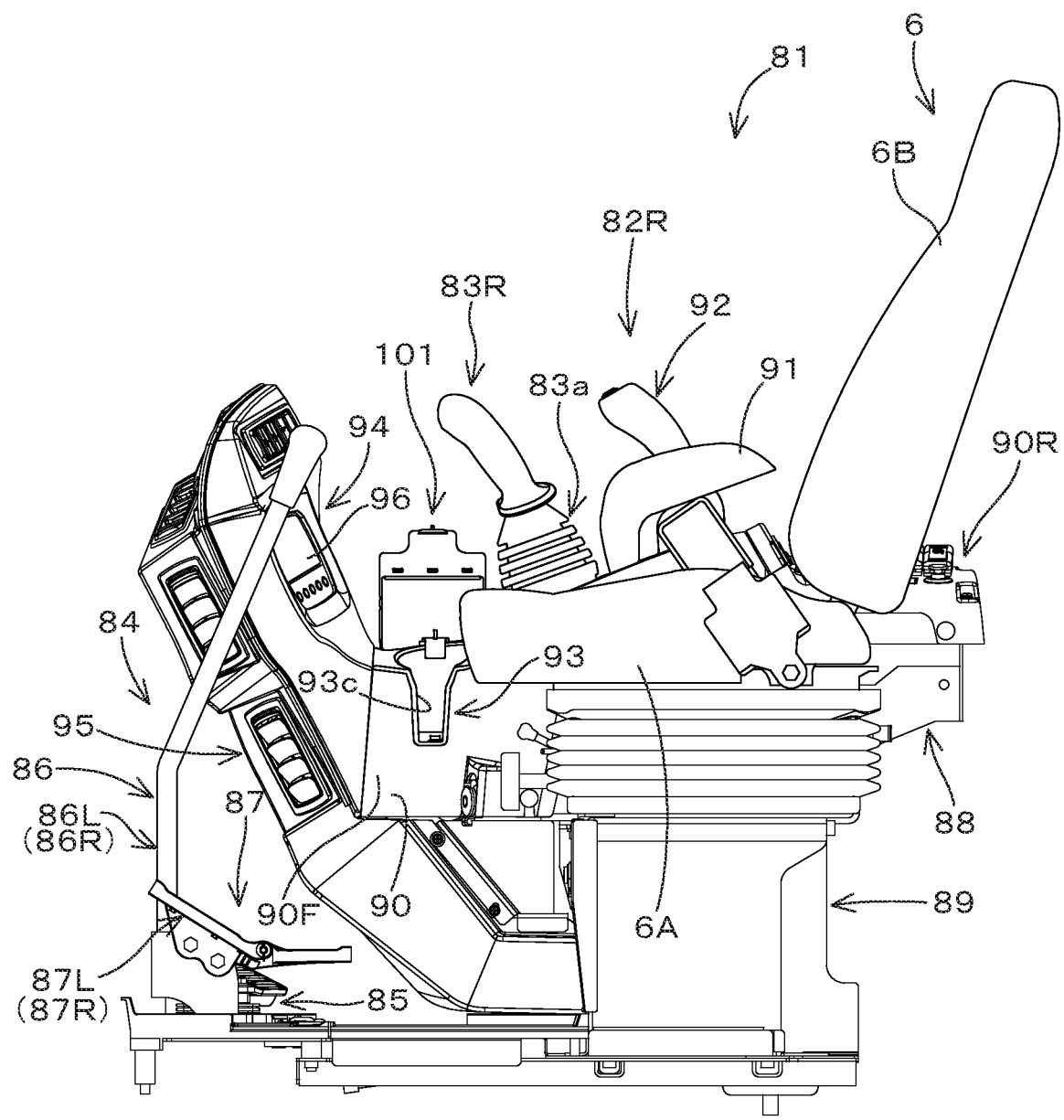
FIG. 3 is a left side view of the operator section.
Figure 6:
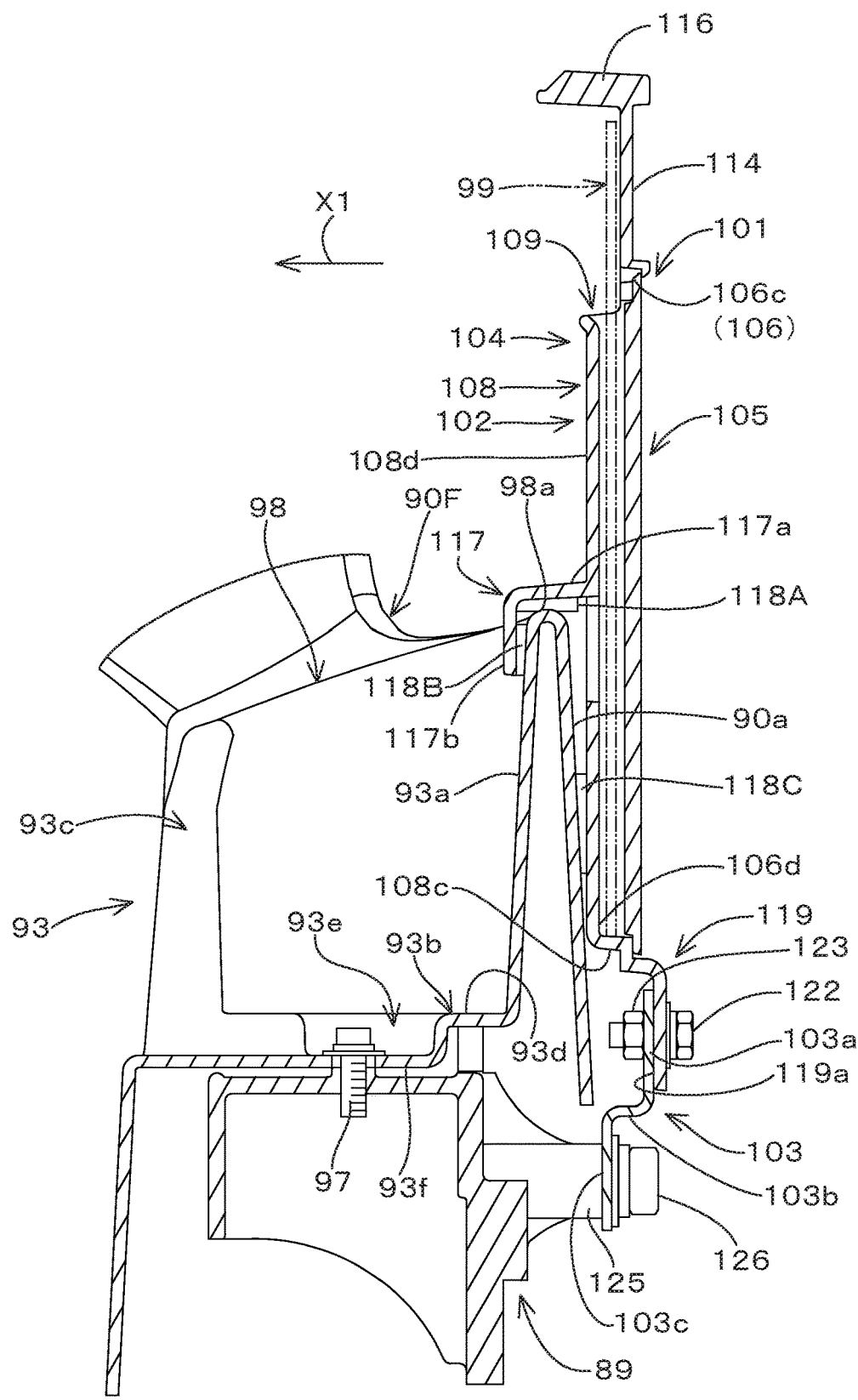
FIG. 6 is a cross-sectional rear view of an attached portion of the housing body (as seen from the rear of a working machine).
Figure 8:
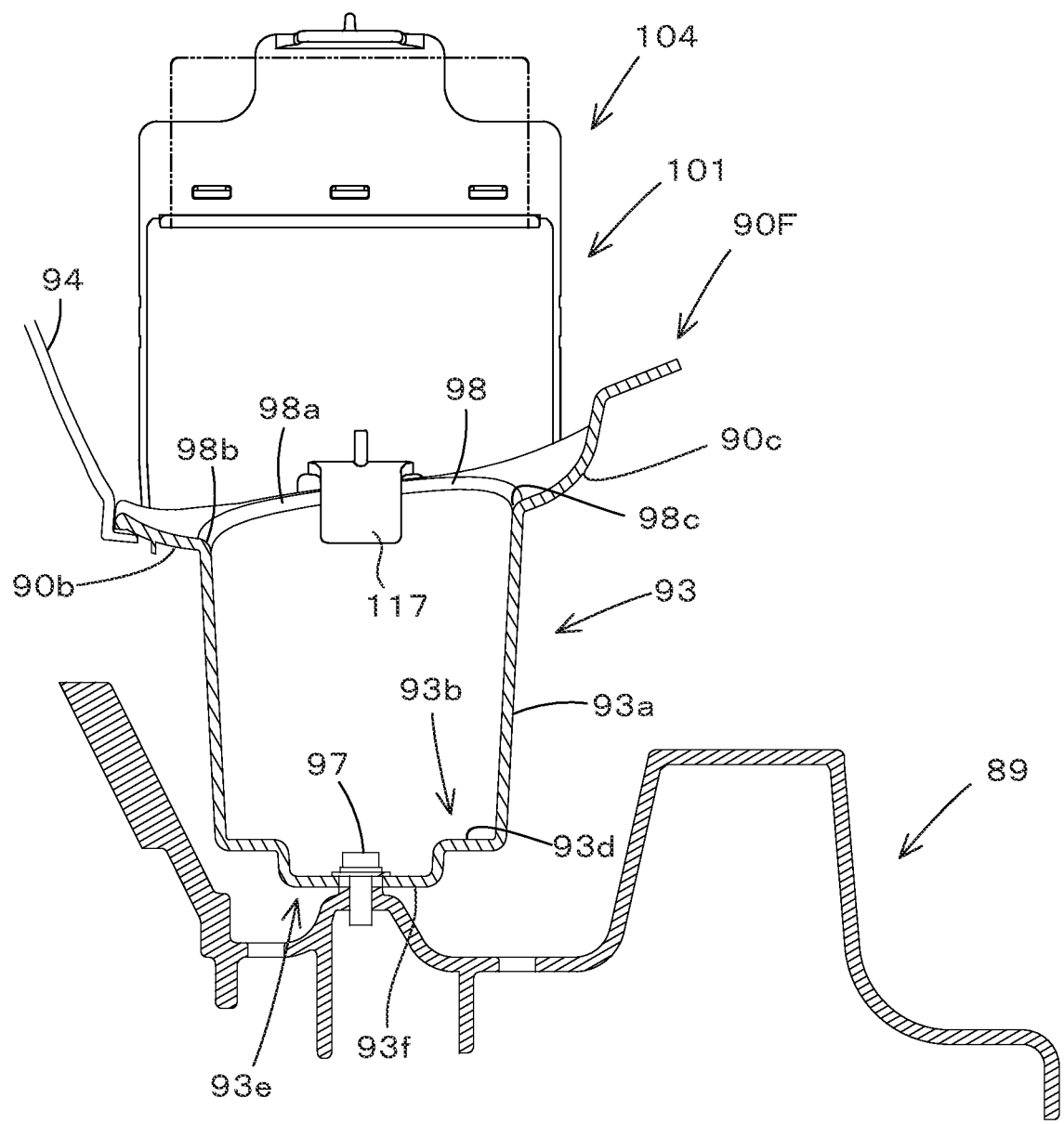
FIG. 8 is a cross-sectional side view of the attached portion of the housing body (as seen in the lateral direction of the working machine).

As illustrated in FIGS. 2 and 3, the drink holder 93 is located forward of a proximal portion 83*a* of the first manipulator lever 83R and lower than the first manipulator lever 83R. The drink holder 93 is located diagonally in front of the operator's seat 6 (seat part 6A). As illustrated in FIGS. 6 and 8, the drink holder 93 is in the form of a cup that has a peripheral wall 93*a* and a bottom 93*b* and that opens upward. The peripheral wall 93*a* has a tapered shape that decreases in diameter in the downward direction. The drink holder 93 has a cutout 93*c* in the peripheral wall 93*a* on the operator's seat 6 side. The cutout 93*c* extends from the top end of the drink holder 93*a* to the bottom 93*b*. The bottom 93*b* has, in a peripheral portion thereof, a placement portion 93*d* for placement of the beverage container. The bottom 93*b* has, in a central portion thereof, a recess 93*e* that is recessed downward. The recess 93*e* has a bottom 93*f*, which is attached to the support bracket 89 with a bolt 97. A lower portion of the cutout 93*c* is in communication with the recess 93*e*.

As illustrated in FIGS. 6 and 8, the drink holder 93 includes a top edge portion 98 which is a top end portion of the peripheral wall 93*a* and which defines the top end opening of the drink holder 93. The top edge portion 98 includes a first section 98*a*, a second section 98*b*, and a third section 98c. As illustrated in FIG. 6, the first section 98a constitutes a portion of the top edge portion 98 on the opposite side from the operator's seat 6, and is folded downward and connected to a lateral wall 90a of the front section 90F in a continuous manner. The space between the lateral wall 90a and the peripheral wall 93a increases in the downward direction. As illustrated in FIG. 8, the second section 98b constitutes a front portion of the top edge portion 98, and is connected to an upper wall's front portion 90b of the front section 90F in a continuous manner. The third section 98c constitutes a rear portion of the top edge portion 98, and is connected to an upper wall's rear portion 90 of the front section 90F in a continuous manner. The operator's seat 6-side part of the top edge portion 98 is missing because of the cutout 93c.

As illustrated in FIGS. 1 to 4, the operator section 81 includes a housing body 101 configured to house a manual (printed material) 99 concerning the working machine 1. The manual 99 is composed of, for example, one or more cards in the form of a rectangle that has a longitudinal dimension in the top-bottom direction (see FIGS. 6 and 10). The manual 99 indicates, for example, what the operator needs to be careful about before or when getting in the working machine 1 and operating the working machine 1. Specifically, the manual 1 indicates that, for example, "the operator needs to read and understand the operator's manual", "the operator needs to ensure that the lock lever for deactivating an actuator equipped on the working machine 1 is in ON position when getting in and out the working machine 1", "the operator needs to check the surroundings of the working machine 1", "the operator needs to fasten the seat belt", and/or the like.

As illustrated in FIGS. 1 to 4, the housing body 101 is disposed forward of the backrest part 6B and on the opposite side of the console box 90 from the operator's seat 6. Specifically, the housing body 101 is disposed on the right side of the front section 90F (drink holder 93). The housing body 101 is disposed on the opposite side of the first manipulator lever 83R from the operator's seat 6 and is disposed forward of the dozer lever 92. Thus, the housing body 101 is located such that the housing body 101 can be easily seen from the operator and does not interfere with the operator's forward view, that the operator's legs do not contact the housing body 101, and that the housing body 101 does not interfere with the manipulation of the first manipulator lever 83R, the dozer lever 92, and the like. In addition, the housing body 101 is disposed forwardly rightward (in the lateral direction outward away from the operator's seat 6) of the armrest 91. This makes it possible for the operator to easily take the manual 99 through the space between the first manipulator lever 83R and the dozer lever 92 with his/her arm on the armrest 91. Furthermore, the housing body 101 is disposed rearward of the traveling lever 86. That is, the housing body 101 is disposed near the operator's seat 6 (operator). That is, since the housing body 101 is disposed rearward of the traveling lever 86 and forward of the backrest part 6B, it can be said that the housing body 101 is located such that the operator can easily take the manual 99 while seated on the operator's seat 6.

Furthermore, the housing body 101 is disposed such that an upper portion thereof protrudes upward from the upper surface of the console box 90 (front section 90F). That is, the upper portion of the housing body 101 is located such that the upper portion can be seen from the operator. Furthermore, the upper end of the housing body 101 is disposed lower than the upper end of the first manipulator lever 83R.

This makes it possible to prevent the operator's hand, holding the first manipulator lever 83R, from contacting the housing body 101.

Figure 5:
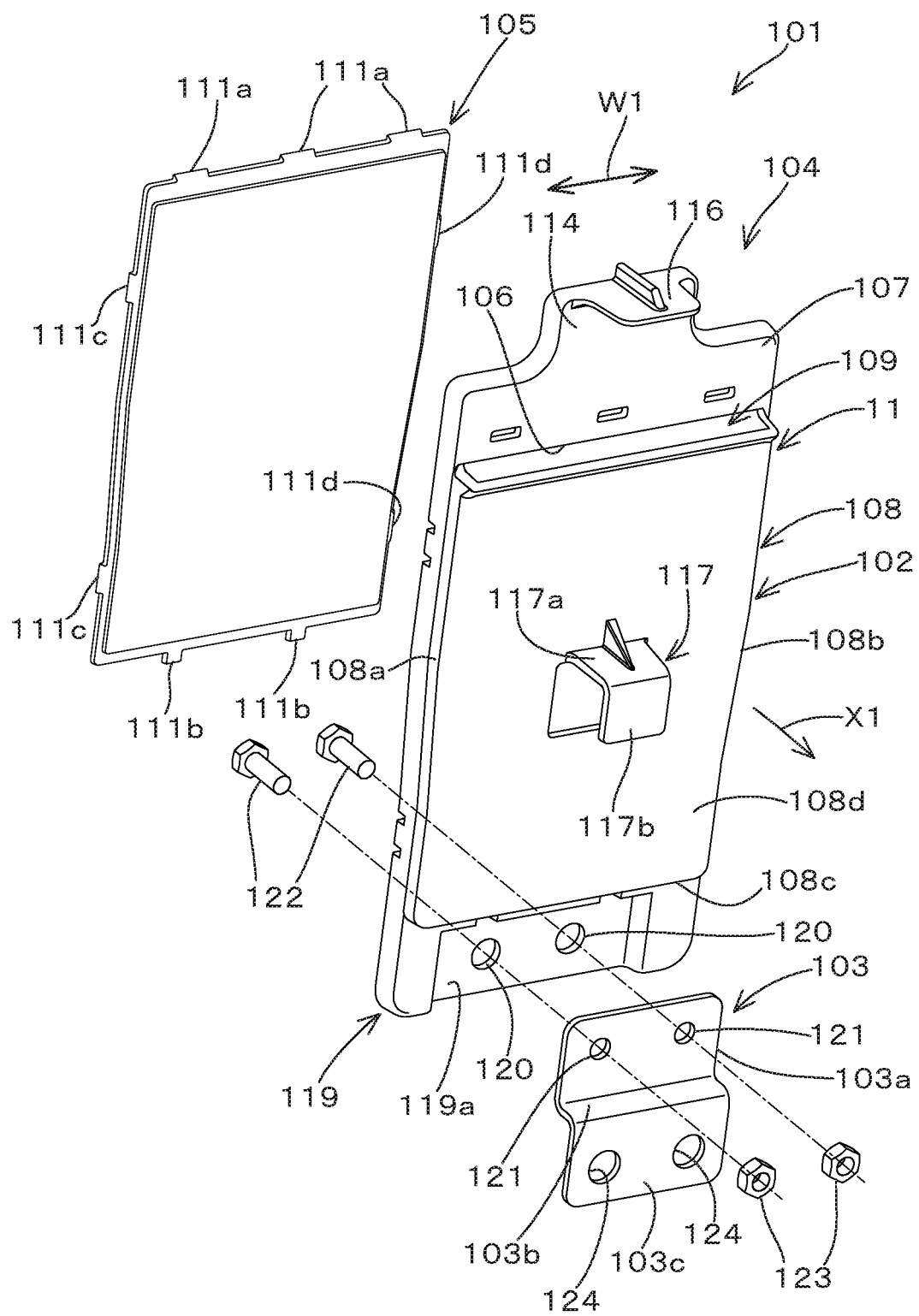
FIG. 5 is an exploded perspective view of a housing body.

As illustrated in FIG. 5, the housing body 101 includes: a holder 102 for housing the manual 99; and an attachment stay (attachment part) 103 with which the holder 102 is attached to the console box 90 (manipulator base 88). The holder 102 includes a holder body 104 and a covering plate 105. The holder body 104 and the covering plate 105 are made of, for example, resin. The attachment stay 103 is made of, for example, a metal sheet. Note that the materials for the holder body 104, the covering plate 105, and the attachment stay 103 are not limited to the above examples, and may be changed as appropriate.

Figure 10:
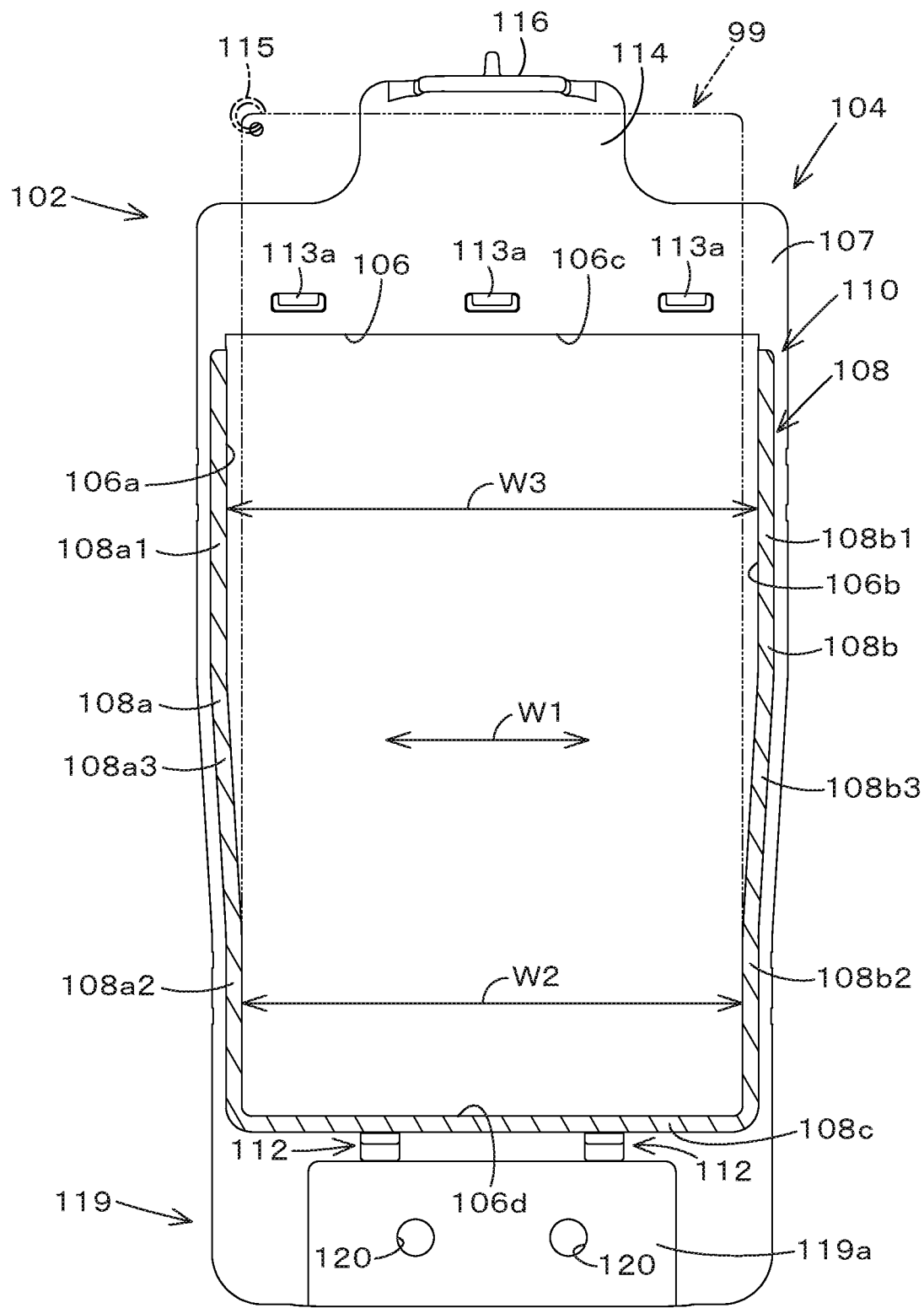
FIG. 10 is a side view partly in section of the housing body (as seen in the lateral direction of the working machine).

As illustrated in FIG. 10, the holder body 104 includes: a base plate portion 107 that has a rectangle opening 106 having a longitudinal dimension in the top-bottom direction; and a housing portion forming portion 108 formed integrally with the base plate portion 107. The opening 106 has: a first edge 106a which is one of the opposite edges in the width direction of the holder body 104 (holder width direction W1) (one of the edges each extending along the top-bottom direction); a second edge 106b opposite the first edge 106a; an upper edge 106c which connects the upper ends of the first edge 106a and the second edge 106b together; and a lower edge 106d which connects the lower ends of the first edge 106a and the second edge 106b together. The holder width direction W1 coincides with the front-rear direction K1 of the machine body 2 when the housing body 101 is attached to the manipulator base 88.

As illustrated in FIG. 5, the housing portion forming portion 108 includes first to fourth walls 108a to 108d. The first wall 108a is provided along the first edge 106a as illustrated in FIG. 10, and extends from the first edge 106a in one of the thickness directions of the base plate portion 107 (such one direction is referred to as "first direction X1") as illustrated in FIG. 12. When the housing body 101 is attached to the manipulator base 88, the first direction X1 coincides with a direction toward the operator's seat 6 along the machine body width direction K2. The second wall 108b is provided along the second edge 106b as illustrated in FIG. 10, and extends from the second edge 106b in the first direction X1 as illustrated in FIG. 12. The third wall 108c is provided along the lower edge 106d as illustrated in FIG. 10, and extends from the lower edge 106d in the first direction X1 as illustrated in FIG. 11.

Figure 11:
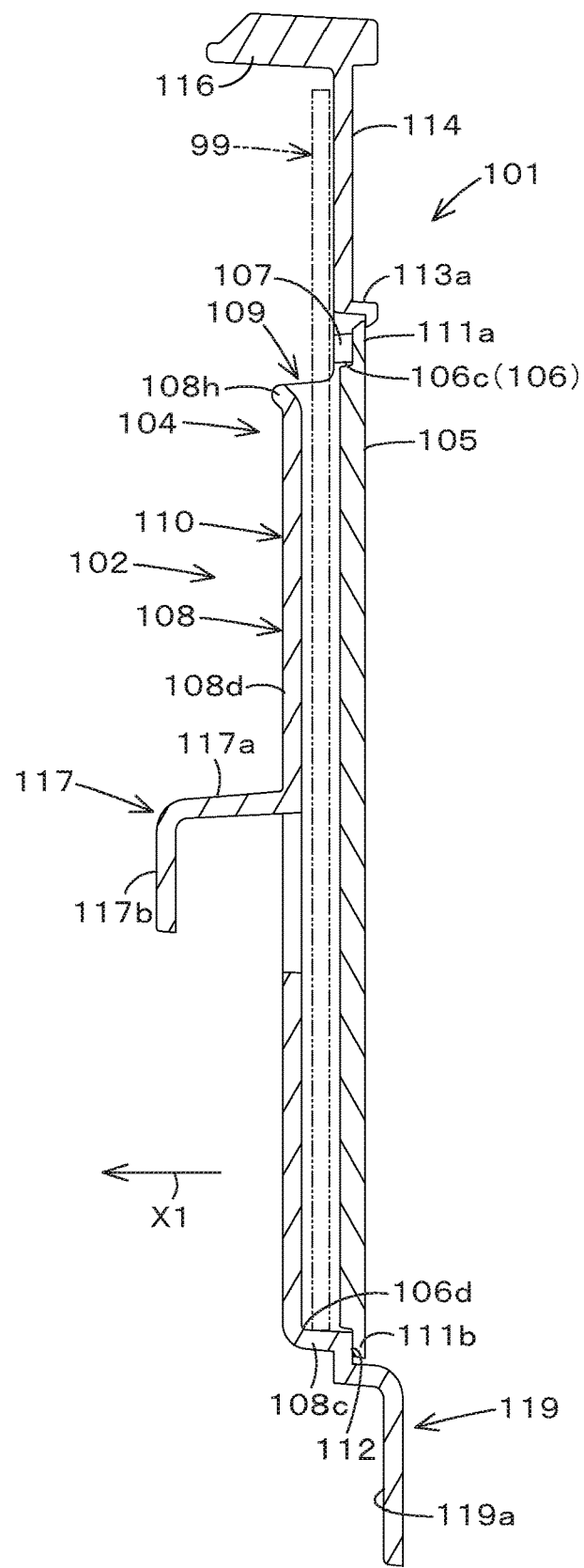
FIG. 11 is a cross-sectional rear view of the housing body (as seen from the rear of the working machine).
Figure 12:
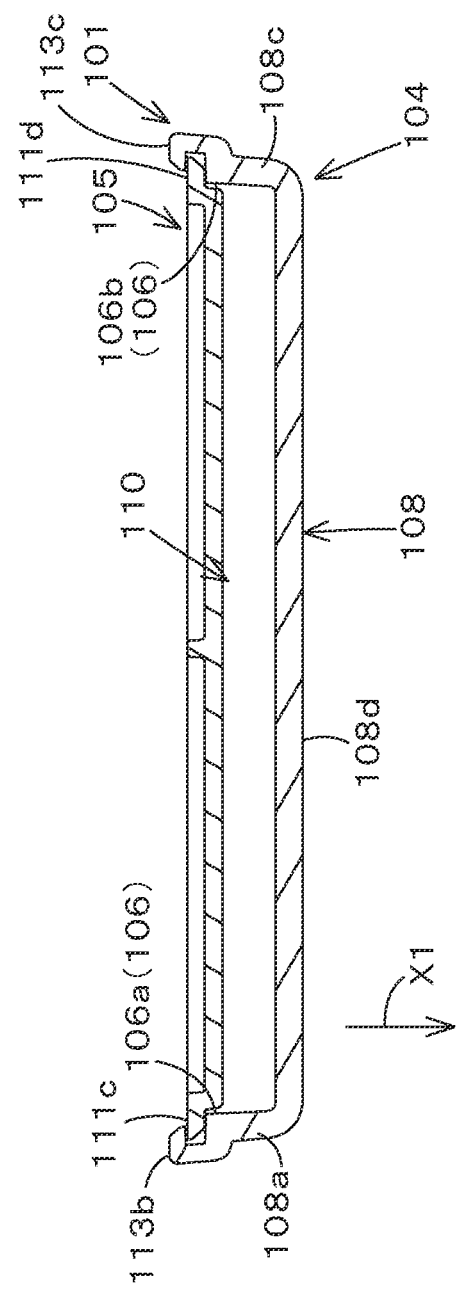
FIG. 12 is a cross-sectional plan view of the housing body (as seen from above).

As illustrated in FIGS. 11 and 12, the fourth wall 108d is separated in the first direction X1 from the base plate portion 107 at a predetermined distance, and is opposed from the opening 106. The fourth wall 108d has a size that corresponds to the opening 106. Edges of the fourth wall 108d are connected to the first wall 108a, the second wall 108b, and the third wall 108c. It follows that the first to fourth walls 108a to 180d define a space that accommodates the manual 99. The upper edge of the fourth wall 108d is not connected with the upper edge 106c of the opening 106 (see FIG. 11). That is, there is a gap between the upper edge of the fourth wall 108d and the upper edge 106c of the opening 106. Such a gap between the upper edge of the fourth wall 108d and the upper edge 106c of the opening 106 serves as an insertion opening 109 for insertion of the manual 99 (see FIGS. 6, 10, and 11).

As illustrated in FIGS. 11 and 12, the covering plate 105 is disposed on the opposite side of the base plate portion 107 from the housing portion forming portion 108, and closes the opening 106 in the base plate portion 107. Thus, the housing portion forming portion 108 and the covering plate 105 form a housing portion 110 which has the insertion opening 109 at an upper portion thereof and which houses the manual 99.

As illustrated in FIG. 10, a distance W2 between a lower portion 108a2 of the first wall 108a and a lower portion 108b2 of the second wall 108b is smaller than a distance W3 between an upper portion 108a1 of the first wall 108a and an upper portion 108b1 of the second wall 108b. That is, the housing portion 110 is wide in its upper portion and narrow in its lower portion. Furthermore, the above distance W2 is set to a size that is equal to or slightly greater than the width of the manual 99 along the same direction. This is a special design to make it easy to insert the manual 99 and prevent the inserted manual 99 from moving. The upper portion 108a1 and the lower portion 108a2 of the first wall 108a are connected together by an inclined wall portion 108a3, and the upper portion 108b1 and the lower portion 108b2 of the second wall 108b are connected together by an inclined wall portion 108b3. The wall portion 108a3 and the wall portion 108b3 are provided such that the distance between them decreases in the downward direction.

As illustrated in FIG. 11, an upper edge portion 108h of the fourth wall 108d is inclined such that the upper edge portion 108h is more distant from the covering plate 105 in the first direction X1 (direction away from the covering plate 105) as it goes upward. This also makes it easy to insert the manual 99.

Figure 13:
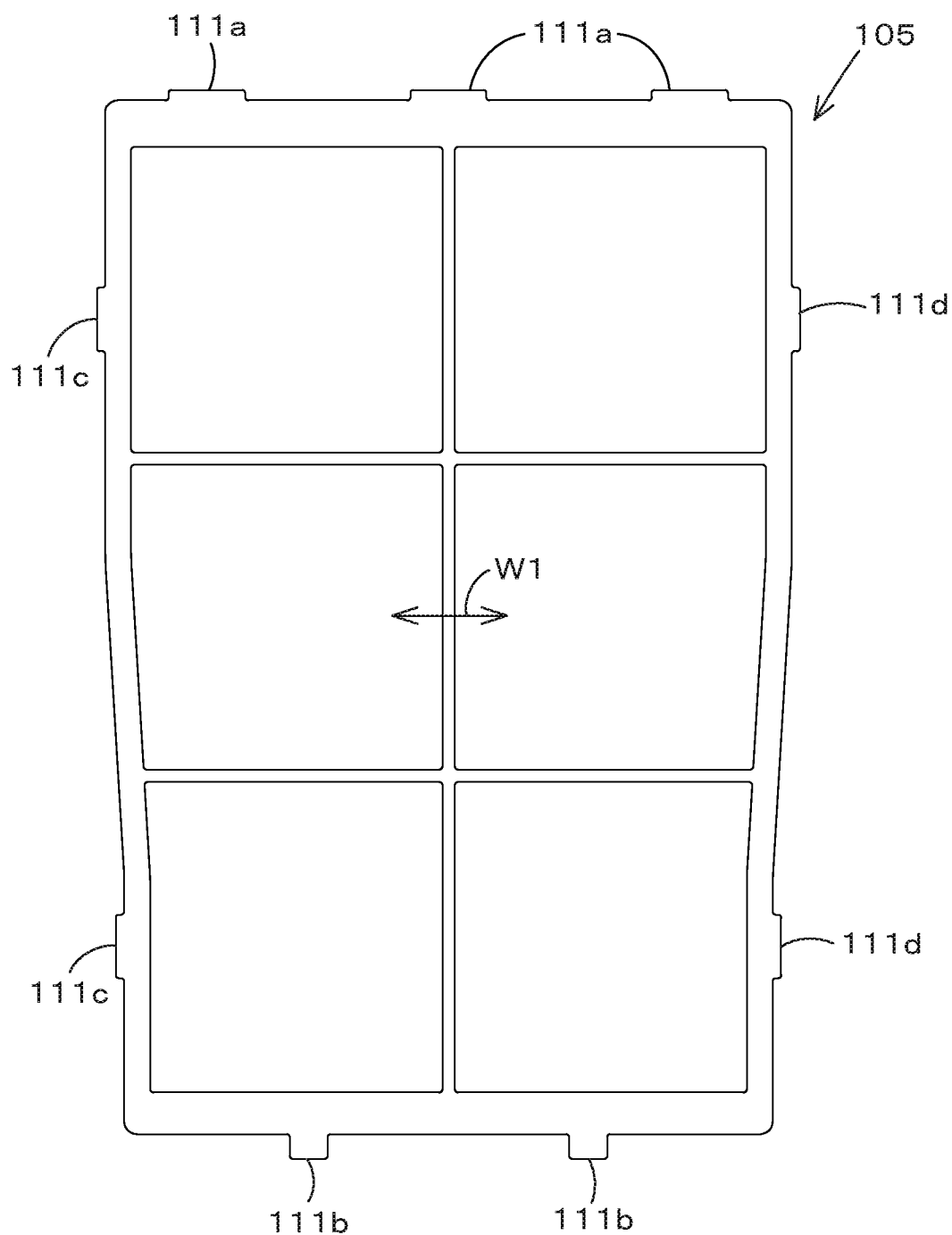
FIG. 13 is a side view of a covering plate (as seen in the lateral direction of the working machine).

As illustrated in FIG. 13, the covering plate 105 has a plurality of engagement tabs 111a to 111d. Specifically, the covering plate 105 has: a plurality of engagement tabs 111a provided on the upper edge of the covering plate 105; a plurality of engagement tabs 111b provided on the lower edge of the covering plate 105; a plurality of engagement tabs 111c provided on one of the opposite edges in the holder width direction W1; and a plurality of engagement tabs 111d provided on the other of the opposite edges in the holder width direction W1.

As illustrated in FIGS. 10 and 11, the holder body 104 has, in a lower portion thereof, insertion portions 112 into which the engagement tabs 111b are inserted, and has, in an upper portion thereof, engagement hooks 113a to which the engagement tabs 111a are engaged. Furthermore, as illustrated in FIG. 12, the holder body 104 has, in one of the opposite edge portions in the holder width direction W1, engagement hooks 113b to which the engagement tabs 111c are engaged, and has, in the other of the opposite edge portions in the holder width direction W1, engagement hooks 113c to which the engagement tabs 111d are engaged. The covering plate 105 is attached to the holder body 104 by inserting the engagement tabs 111b into the insertion portions 112 and engaging the engagement tabs 111a, 111c, and 111d to their corresponding engagement hooks 113a, 113b, and 113c.

As illustrated in FIG. 10, the manual 99 is housed in the housing portion 110 such that the upper portion thereof partially protrudes upward from the housing portion 110 (insertion opening 109). The holder body 104 has a protruding portion 114 that protrudes upward from the top of the base plate portion 107. The protruding portion 114 protrudes upward from the middle portion of the base plate portion 107 in the holder width direction W1. The manual 99, when housed in the housing portion 110, protrudes upward relative to the upper edge of the base plate portion 107 and protrudes from the protruding portion 114 along the width direction; therefore, it is easy to pick up the top corner portions of the manual 99. That is, it is easy to take the manual 99 out of the housing portion 110. It is also possible to prevent a ring member 115, which binds a plurality of cards of the manual 99, from contacting the holder 102.

As illustrated in FIG. 10, the holder body 104 (housing body 101) has a stopper protrusion 116 provided on an upper portion of the protruding portion 114. The stopper protrusion 116 extends from the upper portion of the protruding portion 114 to an area above the insertion opening 109. The stopper protrusion 116 is provided above the insertion opening 109, and is located above the manual 99 housed in the housing portion 110. This makes it possible for the stopper protrusion 116 to prevent the manual 99 from escaping from the housing portion 110.

Figure 9:
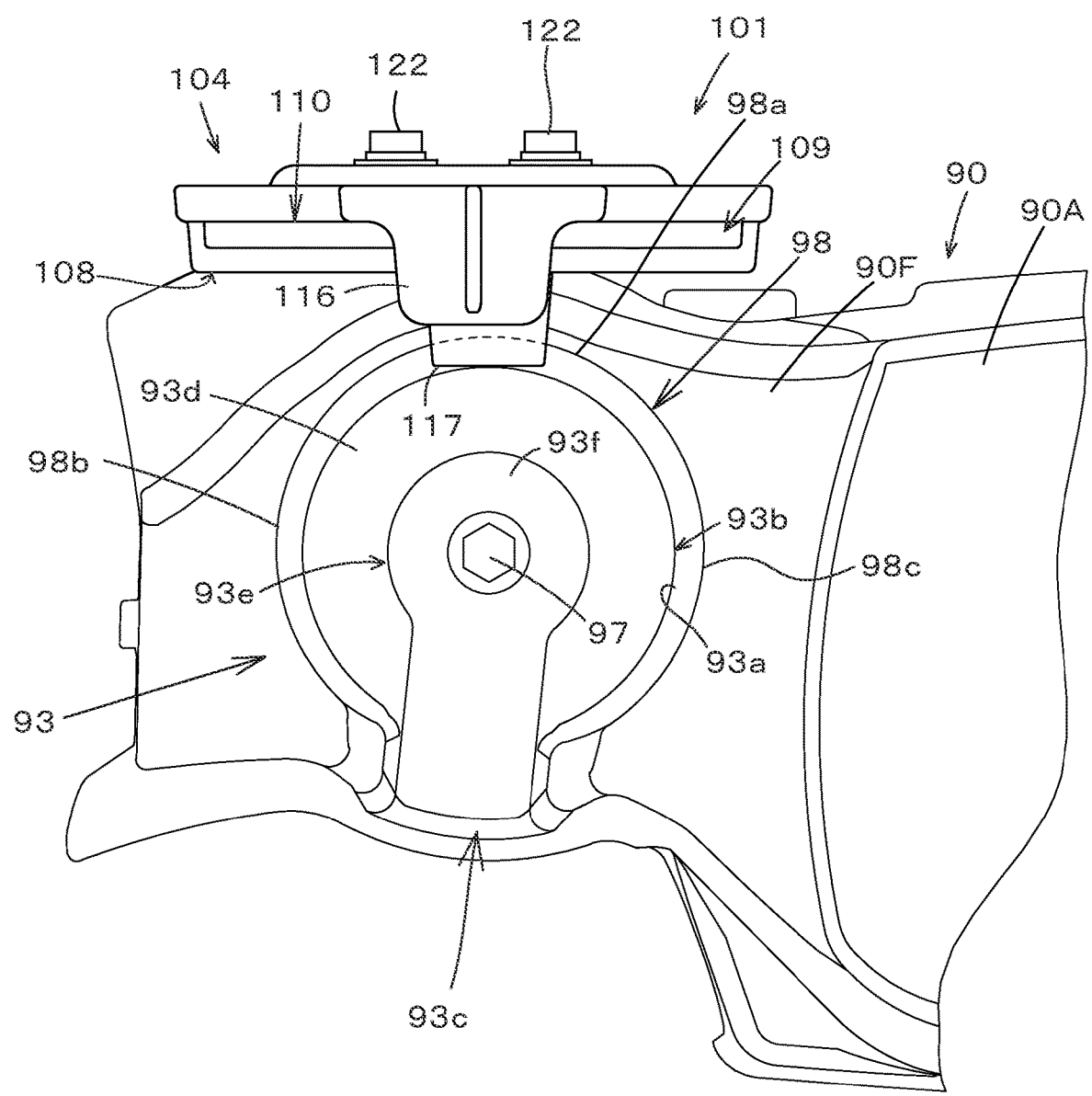
FIG. 9 is a plan view of the attached portion of the housing body.

As illustrated in FIGS. 6 and 9, when the housing body 101 is attached to the manipulator base 88, the stopper protrusion 116 falls short of the position right above the top edge portion 98 of the drink holder 93. That is, the stopper protrusion 116 is located such that the stopper protrusion 116 does not overlap the opening of the drink holder 93 when seen in plan view. This makes it possible to eliminate or reduce the likelihood that an engagement part will interfere with the beverage container held in the drink holder 93 or hinder the insertion or removal of the beverage container.

As illustrated in FIGS. 5 and 6, the holder body 104 (housing body 101) has an engagement portion (hook portion) 117 which is engaged to the console box 90. The engagement portion 117 is formed integrally with the fourth wall 108d of the housing portion forming portion 108 so as to form a hook. Specifically, as illustrated in FIG. 11, the engagement portion 117 has a letter L shape composed of: an upper wall 117a that extends from the fourth wall 108d in the first direction X1 (on the opposite side from the opening 106 and the covering plate 105); and a bent-down wall 117b that extends downward from the distal edge of the upper wall 117a. As illustrated in FIG. 6, the engagement portion 117 is located substantially in the middle of the fourth wall 108d in the top-bottom direction and substantially in the middle of the fourth wall 108d in the holder width direction W1.

As illustrated in FIGS. 1 and 6, the housing body 101 is engaged to an upper portion of the drink holder 93 with the engagement portion 117. Specifically, the engagement portion 117 is hooked on a part of the upper portion of the drink holder 93 at the opposite side from the operator's seat 6. More specifically, as illustrated in FIG. 6, the upper wall 117a of the engagement portion 117 abuts an upper end of the first section 98a with a cushion member 118A therebetween, and the bent-down wall 117b abuts an upper portion of the peripheral wall 93a with a cushion member 118B therebetween. Furthermore, the fourth wall 108d abuts the lateral wall 90a with a cushion member 118C therebetween. Since the engagement portion 117 is hooked on the upper portion of the drink holder 93, an upper portion of the housing body 101 positioned higher than the engagement portion 117 protrudes upward relative to the console box 90. This makes the housing body 101 easily viewable to the operator, and makes it easy for the operator to take the manual 99.

As illustrated in FIG. 6, the peripheral wall 93a of the drink holder 93 has a tapered shape that increases in diameter in the upward direction, and the engagement portion 117 is engaged to the upper portion of the drink holder 93. Therefore, in a plan view shown in FIG. 9, the protruding distal end of the engagement portion 117 is located above the outer edge of a bottom wall 93b of the drink holder 93, and does not overlap the region of the bottom wall 93b. This prevents the beverage container held in the drink holder 93 from contacting the engagement portion 117 and leaning.

Note that the console box 90 may separately have a hook part on which the engagement portion 117 is to be hooked.

As illustrated in FIG. 5, the housing body 101 has, in a lower portion thereof, a stay attachment portion 119 to which the attachment stay 103 is attached. The stay attachment portion 119 extends downward from the lower edge of the base plate portion 107. That is, the stay attachment portion 119 is located below the housing portion 110. The stay attachment portion 119 has an attachment recess 119a that has a longitudinal dimension in the holder width direction W1. As illustrated in FIG. 11, the attachment recess 119a is recessed in a direction from the fourth wall 108d toward the covering plate 105. The attachment recess 119a also opens downward. The attachment recess 119a has, in its bottom, a plurality of bolt insertion holes 120 arranged along the holder width direction W1.

As illustrated in FIGS. 5 and 6, the attachment stay 103 includes: an upper plate portion 103a that is inserted into the attachment recess 119a; an intermediate plate portion 103b that extends from the lower edge of the upper plate portion 103a in a direction away from the covering plate 105 (first direction X1); and a lower plate portion 103c that extends downward from the distal edge of the intermediate plate portion 103b. The upper plate portion 103a has a plurality of bolt insertion holes 121 corresponding to the plurality of bolt insertion holes 120, and is attached to the stay attachment portion 119 (bottom of the attachment recess 119a) with a plurality of bolts 122 and a plurality of nuts 123. The lower plate portion 103c has a plurality of bolt insertion holes 124 arranged along the holder width direction W1.

Figure 4:
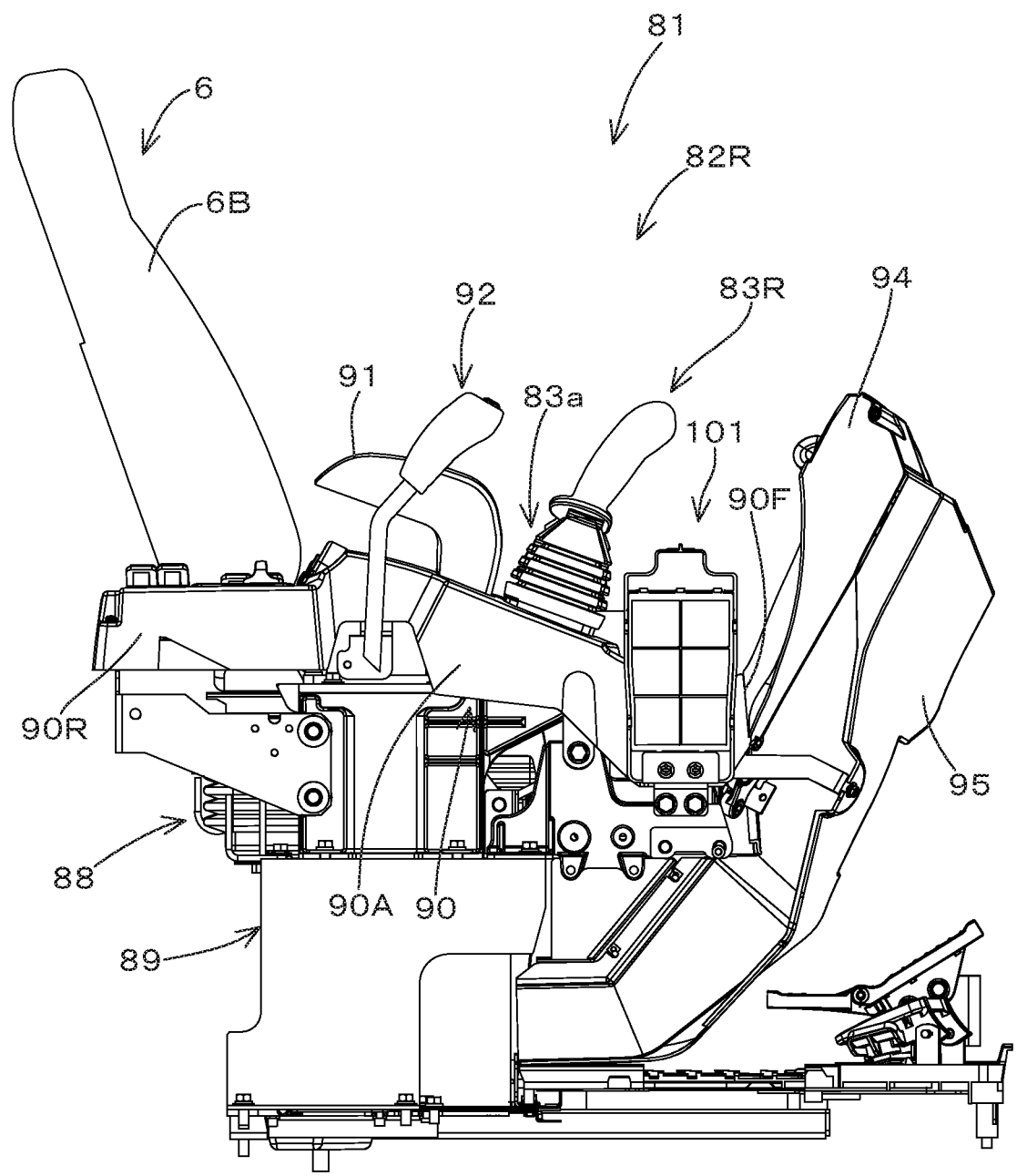
FIG. 4 is a right side view of the operator section.
Figure 7:
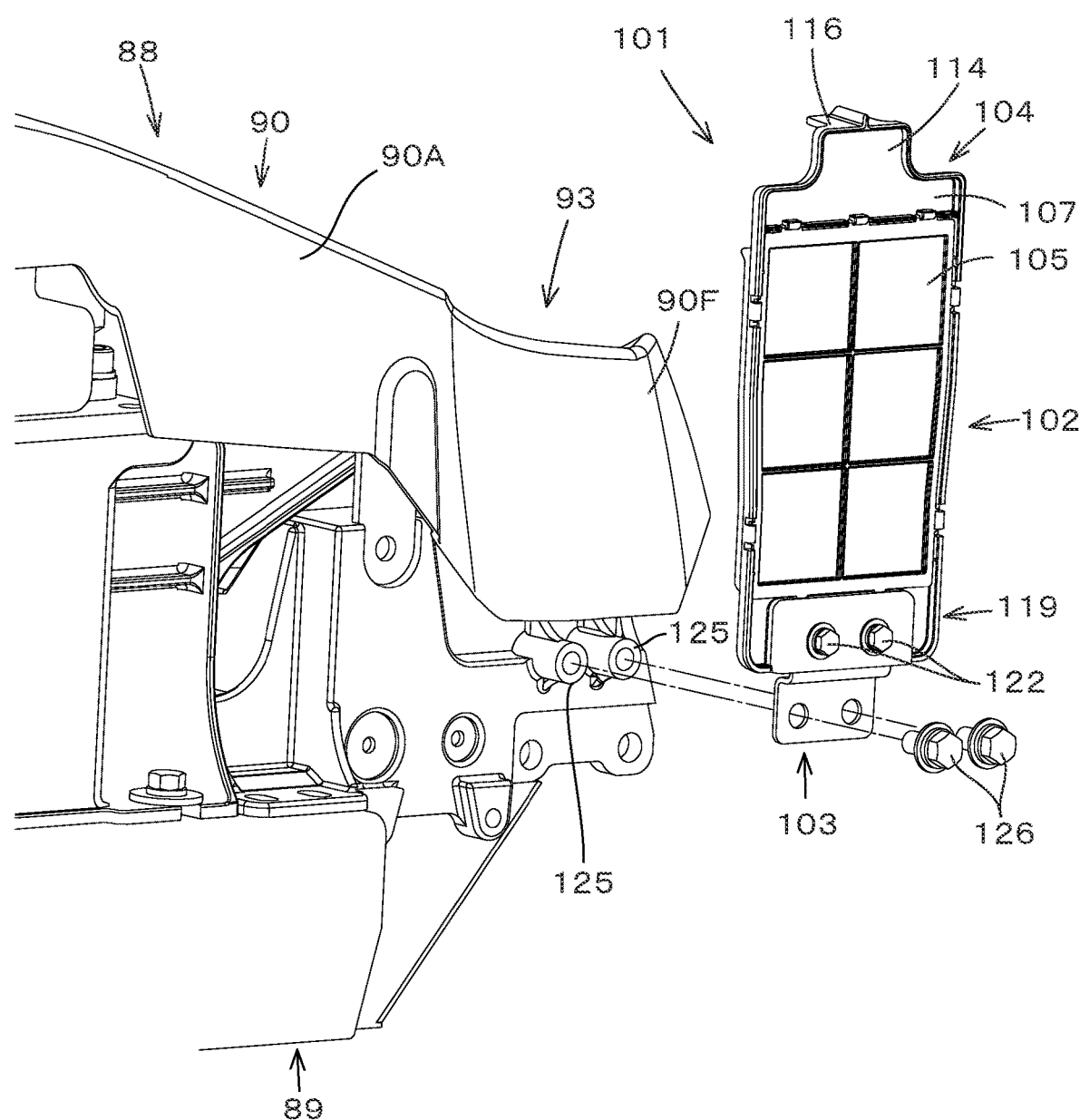
FIG. 7 is a perspective view of the attached portion of the housing body.

As illustrated in FIGS. 4 and 7, the lower plate portion 103c of the attachment stay 103 is attached to the support bracket 89 (manipulator base 88). The support bracket 89 is provided with a plurality of attachment bosses (cylindrical parts) 125 for attachment of the attachment stay 103 (housing body 101). The plurality of attachment bosses 125 have respective screw holes, and are arranged along the front-rear direction K1 below the drink holder 93 at the opposite side of the drink holder 93 from the operator's seat 6. The attachment stay 103 is attached to the support bracket 89 with a plurality of bolts 126 that pass through the respective bolt insertion holes 124 and are threaded into the respective attachment bosses 125.

Note that the shape and the position of attachment of the attachment stay 103 are not limited to those of the present embodiment. An attachment stay 103 having a different shape can be attached to a different type of working machine 1. Furthermore, although the housing body 101 of the present embodiment is attached to the working machine 1 equipped with the cabin 5, the housing body 101 may be attached to a working machine 1 equipped with a canopy instead of the cabin 5 or a working machine 1 not equipped with the cabin 5 or the canopy.

A working machine 1 according to the present embodiment brings about the following effects.

A working machine 1 includes: a machine body 2; an operator's seat 6 mounted on the machine body 2 and including a seat part 6A and a backrest part 6B; a manipulator base 88 disposed on a lateral side of the operator's seat 6; and a housing body 101 for housing a printed material (manual 99) therein, and the housing body 101 is disposed forward of the backrest part 6B and on an opposite side of the manipulator base 88 from the operator's seat 6.

The configuration makes it possible to locate a printed material (manual 99) such that the operator can easily know where the printed material is and that the printed material does not interfere with the manipulation of the manipulator lever and/or the like.

The manipulator base 88 includes a drink holder 93 for holding a beverage container, and the housing body 101 is engaged to the drink holder 93.

The configuration makes it possible to attach the housing body 101 with use of the drink holder 93, and thus makes it possible to achieve a simple structure.

The housing body 101 includes: a housing portion 110 configured to house a printed material (manual 99) therein and having an insertion opening 109 at an upper portion thereof; and a stopper protrusion 116 provided above the insertion opening 109 to prevent the printed material (manual 99) from escaping from the housing portion 110.

The configuration makes it possible to prevent the printed material (manual 99) from escaping from the housing portion 110 due to vibrations or the like.

The working machine 1 further includes a front working device 4 including a boom 12 and a working tool 14, a manipulator lever 83R for operating the front working device 4 is provided on the manipulator base 88, and the housing body 101 is disposed forward of the manipulator lever 83R.

The configuration makes it possible to locate the housing body 101 such that the housing body 101 does not interfere with the manipulation of the manipulator lever 83R.

The working machine 1 includes a dozer 7, and a dozer lever 92 for operating the dozer 7 is provided on the manipulator base 88, the dozer lever 92 is disposed on an opposite side of the manipulator lever 83R from the operator's seat 6 and rearward of the manipulator lever 83R, and the housing body 101 is disposed on an opposite side of the manipulator lever 83R from the operator's seat 6 and forward of the dozer lever 92.

The configuration makes it possible to easily take the printed material (manual 99) housed in the housing body 101 through the space between the manipulator lever 83R and the dozer lever 92.

The working machine 1 further includes: a traveling device 3; and a traveling lever 86 for operating the traveling device 3, the traveling lever 86 being disposed forward of the operator's seat 6, and the housing body 101 is disposed rearward of the traveling lever 86.

With the configuration, the housing body 101 is disposed near the operator, and the operator can easily take the printed material (manual 99).

Furthermore, an upper portion of the housing body 101 protrudes upward from an upper surface of the manipulator base 88.

With the configuration, the printed material (manual 99) is easily visible to the operator.

Furthermore, an upper end of the housing body 101 is disposed lower than an upper end of the manipulator lever 83R.

The configuration makes it possible to prevent the housing body 101 from interfering with the manipulation of the manipulator lever 83R.

The housing body 101 includes: an engagement portion 117 to be engaged to an upper portion of the drink holder 93; and an attachment part (attachment stay 103) to be attached to the manipulator base 88, the attachment part (attachment stay 103) being disposed below the engagement portion 117.

The configuration makes it possible to easily attach the housing body 101.

A housing body 101 according to the present embodiment is a housing body 101 for housing a printed material (manual 99) therein, the housing body 101 being attached to a working machine 1, the working machine 1 including a machine body 2, an operator's seat 6, a manipulator base 88 disposed on a lateral side of the operator's seat 6, and a drink holder 93 provided on the manipulator base 88, in which the housing body 101 includes: an engagement portion 117 to be engaged to an upper portion of the drink holder 93; and an attachment part (attachment stay 103) to be attached to the manipulator base 88, the attachment part (attachment stay 103) being disposed below the engagement portion 117.

The configuration makes it possible to easily attach the housing body 101 to the working machine 1.

The housing body 101 further includes: a housing portion 110 configured to house a printed material (manual 99) therein and having an insertion opening 109 at an upper portion thereof; and a stopper protrusion 116 provided above the insertion opening 109 to prevent the printed material (manual 99) from escaping from the housing portion 110.

The configuration makes it possible to prevent the printed material (manual 99) from escaping from the housing portion 110 due to vibrations or the like.

Embodiments of the present invention have been described so far. In this regard, the embodiments disclosed herein should be considered as examples in all aspects and should not be considered as limitations. The scope of the present invention is defined not by the foregoing description but by the claims, and is intended to include all modifications within the scope of the claims and their equivalents.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
   a machine body;
   an operator's seat mounted on the machine body and including a seat part and a backrest part;
   a manipulator base disposed on a lateral side of the operator's seat; and
   a housing body for housing therein a printed material including one or more cards,
   wherein the manipulator base is provided with a manipulator lever disposed on the lateral side of the operator's seat and forward of the backrest part, and
   wherein the housing body
      is attached to a side portion of the manipulator base that is located forward of the manipulator lever and that faces away from the operator's seat, and
      is disposed on an opposite side of the manipulator base from the operator's seat.

2. The working machine according to claim 1,
   wherein the manipulator base includes a drink holder for holding a beverage container, the drink holder being located forward of the manipulator lever,
   wherein the drink holder includes a top edge portion which defines a top end opening for insertion of the beverage container,
   wherein the housing body includes:
      an engagement portion to be hooked on the top edge portion of the drink holder; and
      an attachment part to be attached to the manipulator base, the attachment part being disposed below the engagement portion, and
   wherein the engagement portion is hooked on a part of the top edge portion of the drink holder at an opposite side from the operator's seat such that the housing body is located on an opposite side of the drink holder from the operator's seat.

3. The working machine according to claim 1,
   wherein the housing body includes:
      a housing portion configured to house the printed material therein and having an insertion opening at an upper portion thereof; and
      a stopper protrusion provided above the insertion opening to prevent the printed material from escaping from the housing portion.

4. The working machine according to claim 1, further comprising:
   a front working device including a boom and a working tool,
   wherein the manipulator lever on the manipulator base is a manipulator lever for operating the front working device.

5. The working machine according to claim 1,
   wherein the working machine includes a dozer, and a dozer lever for operating the dozer is provided on the manipulator base,
   wherein the dozer lever is disposed on an opposite side of the manipulator lever from the operator's seat and rearward of the manipulator lever, and
   wherein the housing body is disposed on an opposite side of the manipulator lever from the operator's seat and forward of the dozer lever.

6. The working machine according to claim, 1 further comprising:
   a traveling device; and
   a traveling lever for operating the traveling device, the traveling lever being disposed forward of the operator's seat,
   wherein the housing body is disposed rearward of the traveling lever.

7. The working machine according to claim 2,
   wherein the housing body includes a wall portion which includes a wall surface facing toward the drink holder and which is located at an outer surface side of the drink holder, and the housing body is configured such that an upper portion of the wall portion protrudes upward from the top edge portion of the drink holder, and
   wherein the engagement portion includes:
      an upper wall that extends from an upper portion of the wall portion in a direction toward the operator's seat to be located on the top edge portion of the drink holder; and
      a bent-down wall that extends downward from a distal edge of the upper wall to be located at an inner surface side of the drink holder.

8. The working machine according to claim 1,
   wherein an upper end of the housing body is disposed lower than an upper end of the manipulator lever.

9. The working machine according to claim 2,
   wherein
   the manipulator base includes a console box provided with the drink holder, and a support bracket to which the console box is attached, and
   the attachment part is attached to the support bracket.

10. A housing body for housing therein a printed material including one or more cards, the housing body being attached to a working machine, the working machine including a machine body, an operator's seat, a manipulator base disposed on a lateral side of the operator's seat, a manipulator lever provided on the manipulator base such that the manipulator lever is disposed on the lateral side of the operator's seat and forward of a backrest part of the operator's seat and a drink holder provided on the manipulator base such that the drink holder is located forward of the manipulator lever and including a top edge portion which defines a top end opening for insertion of a beverage container, and the housing body comprising:
- an engagement portion to be engaged to the top edge portion of the drink holder; and
- an attachment part to be attached to the manipulator base, the attachment part being disposed below the engagement portion,
- wherein the engagement portion is hooked on a part of the top edge portion of the drink holder at an opposite side from the operator's seat such that the housing body is located on an opposite side of the drink holder from the operator's seat.

11. The housing body according to claim 10, further comprising:
- a housing portion configured to house the printed material therein and having an insertion opening at an upper portion thereof; and
- a stopper protrusion provided above the insertion opening to prevent the printed material from escaping from the housing portion.

* * * * *